United States Patent Office 3,793,418
Patented Feb. 19, 1974

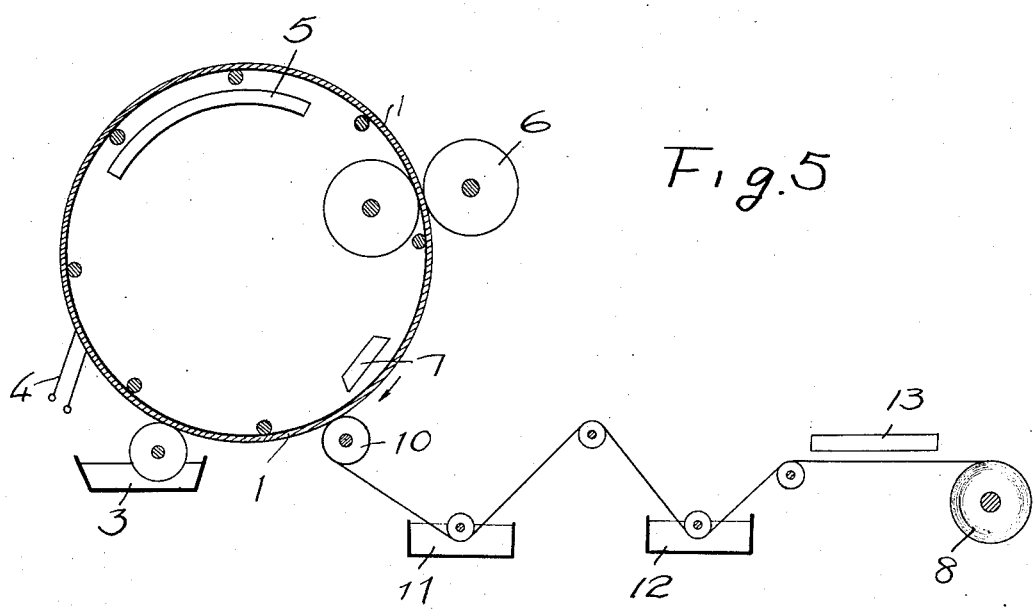

3,793,418
METHOD OF MANUFACTURING PARTLY COLORED AND PATTERNED LACE WORKS OF SYNTHETIC RESIN
Tsuguya Mori, % Meiwa Gravure Chemical Co., Ltd., 1-22-1 Fujimi-cho, Gyoda, Japan
Filed Jan. 26, 1972, Ser. No. 220,750
Claims priority, application Japan, Jan. 29, 1971, 46/3,421
Int. Cl. B29c 13/00; B29d 7/20
U.S. Cl. 264—78                                     5 Claims

ABSTRACT OF THE DISCLOSURE

A method of manufacturing partly colored and patterned lace works of thermoplastic resin, comprising (1) feeding the resin on the surface of a metallic pattern constituted of different metals such as copper, chromium, cadmium, selenium and the like, then heating the resin to effect its gelation, (2) forcing a molten resin into a pattern and cooling the same, (3) heating and pressing a resin film in the intaglioed surface of a metallic pattern constituted of at least two different metals or (4) heating and pressing said film by means of a high frequency welder provided with said metallic pattern, then immersing the resulting film in a particular dyeing solution thereby producing a product partially dyed at least in two different colors.

---

The present invention relates to a method of manufacturing patterned lace works of a thermoplastic synthetic resin, and more particularly it relates to improvements in a method of manufacturing such films or sheets that are printed with a variety of designs by means of a metallic pattern such as an embossing roll, or that are printed under thermal pressure with a variety of designs by means of a metallic pattern mounted to a high frequency welder, or such lace works that are produced by a thermoplastic injection mold machine.

The products manufactured in the method of the present invention are characterized by being partly dyed at least in two different colors by particular dyeing or coloring agents in a manner that the dyed portions of the product correspond to the particular portions of a metallic pattern and can stand proof of weathering, discoloring and stripping-off actions, consequently securing the ornamental effect and long service of the products.

As a most conventional method of manufacturing partially colored and patterned lace works made of a syntetic resin such for exampule as a thermoplastic synthetic resin or the like, it was customary to form patterned lace works in the first place and then print thereon any designs selectively colored in parts.

In this connection I disclosed in my U.S. Letters Patent No. 3,441,635 dated Apr. 29, 1969 an improved method of manufacturing such lace works; and according to which the steps are taken of preparing the surface of a metallic pattern made of at least two different metals and feeding thereon some chemical agents so as to produce on said surface the particles of partly colored metallic compounds thereby manufacturing patterned lace works tinged with the colors of the colored particles attached to said surface; or the steps are taken of preparing the surface of a metallic pattern made of at least two different metals and mixing chemical agents capable of reacting selectively with said different metals which constitute said surface with a thermoplastic synthetic resin paste; then coating said surface of the metallic pattern with the mixture of the chemical agents and said thermoplastic synthetic resin paste so that said mixture can produce on said surface the particles of colored metallic compounds and simultaneously attach the colored metallic particles to said surface.

However, in the above-mentioned methods of my previous invention, it is solely aimed to form partially colored metallic portion of a metallic pattern by attaching to the surface of the lace work the particles that are produced through either of the oxidizing or reducing action of said metallic portions so that the colors of the patterned lace work cannot but be excessively limited, consequently bringing about the disadvantage that said lace work cannot be colored so attractively as desired.

Meanwhile, in order to produce a synthetic resin film or sheet printed on the surface thereof with a suitable design and dyed in any selected color or colors there has been employed, as is well known, such a lace pattern for example as an embossing roll means wherein a suitable printing ink including pigments corresponding to said colors is supplied to the peripheral surface of the embossing roll so as to dye the film or sheet in said colors.

However, the film or sheet products thus produced are given a considerable limitation to their designs and, in addition, some particular selected portions only thereof can be dyed in colors in spite of the use of the above-mentioned embossing roll means that is relatively complicated in structure, thus resulting in being disadvantageous in practical use.

Thus, as another means for obtaining a synthetic resin film or sheet product printed on one side thereof with a variety of suitable designs there has also been employed a high frequency welder means to which is mounted a metallic lace pattern intaglioed with such a variety of desired designs so as to thermally press a synthetic resin film or sheet material on the intaglioed surface of the pattern thereby producing any desired designs on said side of the material.

However, the difficulty with this method is that only some particular portions of the film or sheet material can be dyed in different colors. Therefore, the conventional resin film or sheet products produced in this method are all lacking in the decorating effect as an ornamental design in spite of the use of a high frequency welder means which is expensive in purchasing price and operation cost.

Furthermore it is well known that the synthetic resin film or sheet products printed partially with different colors can be produced by employing either of extruding, injecting and other plastic molding methods. However, such products need to go through at least two processes of plastic formation or otherwise be formed by use of at least two different kinds of synthetic resin material respectively having a different color and a different melting point, thus bringing about the disadvantages that in the former case, the manufacture of the products is made extremely complicated while in the latter case, the resin material cannot readily be molten with uniformity, resulting in the products being of poor quality lacking in equal strength.

Accordingly, the present invention has been designed to eliminate the above-mentioned deficiencies of the products produced in the conventional methods by providing an improved and useful method for producing a product having its parts dyed at least in two different hues in a manner that said parts will not get discolored nor stripped off the product but stand serviceable protractedly with the additional advantage that the product per se can be easily and simply manufactured.

It is one of the present invention, therefore, to provide a metallic lace pattern which is composed of an aggregation of heterogeneous metals including copper (Cu), chromium (Cr), selenium (Se) and the like; said pattern having a surface which is either unevenly formed to present uneven designs thereon or, on the contrary, smoothyl formed to permit the particles of said heterogeneous metals to gather on said surface thereby presenting designs of a product; said metallic pattern being further filled with a paste-like thermoplastic resin having a weak reaction radial which then is heated to effect its gelation; the resulting gelled resin is dyed by a dyestuff such as a special kind of metallic complex salt dye thereby producing a synthetic resin sheet product or lace pattern work tinged partially in two different colors.

It is another object of the invention to provide a metallic pattern such as an embossing roll means having its outer peripheral surface made of different metals and intaglioed with embossed designs so that a synthetic resin film or sheet material is molder thereon, and then dyed by a particular selected dye, consequently producing a synthetic resin film or sheet product of at least two different colors.

It is further another object of the invention to employ the above-mentioned metallic pattern by attaching the same to a high frequency welder means so that when a synthetic resin film or sheet material is thermally pressed on said pattern, it can produce on the pressed surface thereof a variety of designs dyed in at least two different colors.

It is a still further object of the invention to mold a synthetic resin material by use of the above-mentioned particular metallic pattern in the form of a general type metallic pattern to be used for a common molding machine; thereafter dyeing the molded material by using only one kind of dye so as to produce a synthetic resin product having its parts dyed in at least two different colors.

As is clearly evident from the above-mentioned objects of the present invention, the products produced in the method of the invention are advantageous over the conventional ones in that they would not get discolored nor stripped off the products.

Further according to the invention, the products can be produced in a single and one operation by using a metallic pattern which is very little damaged by the weak reaction that takes place between this pattern and a paste-like thermoplastic resin to be applied thereto as will be referred to hereinafter; moreover said products can be selectively dyed in any deep, light or dim colors depending on their services by making the most of the pinholes produced on the plated portions of the metallic pattern.

With these and other objects in view, which will become apparent in the following detailed description, the present invention will be clearly understood in connection with the accompanying drawings, in which:

FIG. 5 is a schematic diagram of the equipment used in the manufacturing method.

Figure 4:
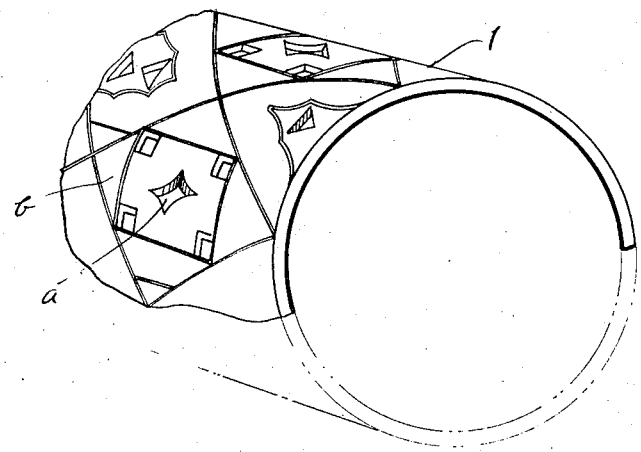
FIG. 4 is a fragmentary perspective view of the metallic pattern shown in FIG. 1.

Referring now to a lace pattern work as an example of a synthetic resin film on sheet product dyed partially in at least two different colors, with reference to the accompanying drawings, any required lace pattern is intaglioed in the first place by a photo-mechanical process upon a copper plate $a$ of abont 2.5 mm. thick, for example, upon the surface thereof. Thereafter, said copper plate $a$ is made into a cylindrical form as is definitely shown in FIG. 4.

Nextly a portion of the intaglioed copper plate $a$ is coated with a different metal $b$ comprising chromium (Cr), cadmium (Cd), selenium (Se) and/or the like thereby to produce a cylindrical metallic pattern having double plating layers $a$ (copper) and $b$ (chromium, cadmium or selenium) different metals.

Meanwhile a paste-like polyvinyl chloride synthetic resin is painted on said intaglioed portion of the cylindrical metallic pattern and is heated until it gels so as to form a patterned lace design on the surface of the metallic pattern as will be described later in reference to FIG. 5.

The cylindrical metallic pattern 1 thus formed is rotated, by a pair of driving rolls 6 provided in contacted relation therewith, at an average speed of 1 meter per minute in the direction as indicated by the arrow thereby painting the paste-like polyvinyl chloride resin 3 on the outer peripheral surface of the metallic pattern 1 through means of a paste feeder (not shown). The paste resin on the portions other than the intaglioed portion is removed by a doctor 4 provided over the metallic pattern 1 so as to spread the paste resin 3 uniformly on the intaglioed portion. The paste resin thus painted is heated at approximately 180° C. for about 3 minutes by a heater 5 installed over the doctor 4 so as to effect its gelation. Then it is cooled by the cool air blown out of a coller 7 arranged on the opposite side of the doctor 4.

After gelation of the paste resin it is stripped off the metallic pattern 1 by a guide roll 10 arranged beneath the cooler 7 and fed into a separate tank 11 containing the aqueous solution of a metallic complex salt dye and is immersed in this solution until it is colored by said dye. The resulting resin 3 is then conveyed to a tank 12 of water following said tank 11 and washed therein, thereafter being further conveyed to a heater or dryer 13 and dried by the hot air supplied thereby while being conveyed under said heater 13. Finally, it is wound up as a finished product by a winder 8.

Figure 1:
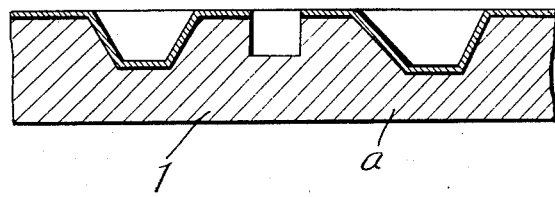
FIG. 1 is a partial, enlarged cross-sectional view of the metallic pattern to be used in the invention.
Figure 2:
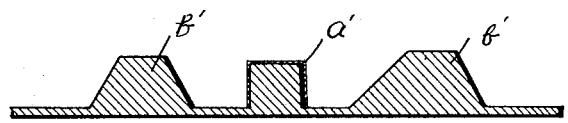
FIG. 2 is a partial, enlarged cross-sectional view of a produce produced in the manufacturing method of the invention.
Figure 3:
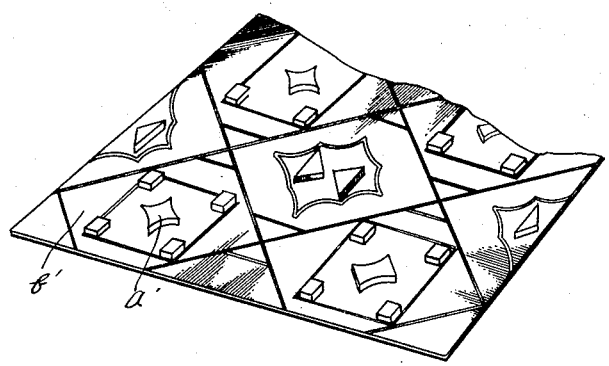
FIG. 3 is a fragmentary perspective view of the product shown in FIG. 2.

In this case, the portion of the paste resin which was evenly filled in the intaglioed portion and contacted the copper plate $a$ is changed in color by the dye. Said dye may be Cibalan Scarlet GL made by the Ciba Co., Ltd. Switzerland, which is available on market, comprising a metallic complex salt dye. Said dye is such that no reaction takes place in the portion of the paste resin contacting the chromium instead of the copper, and the portion will remain white so that the metallic pattern 1 becomes a differently colored pattern composed of color-changed portion $a'$ and unchanged portion $b'$ as is clearly shown in FIGS. 2 and 3.

The metallic complex salt dye as mentioned above is generally adapted to effect chemical reaction with acid so as to change its color. However, in the method of the present invention, Cibalan Scarlet GL was adapted especially to react selectively with a neutral or weak alkaline solution so as to change its color. In other words, any metallic complex salt dye has the properties of being changed in the same kind of color in the acid irrespective of the kind of metal which forms the outer surface of a metallic pattern contacted by a paste-like polyvinyl chloride synthetic resin. However, when it is made to react with a neutral or weak alkaline solution it is selectively changed in different colors depending on the kind of said metal.

Accordingly it is understood that by employing the method of the present invention such defect can be removed that the metallic pattern is attacked by the reaction of the coloring agents aplied to the manufacturing process of the product, which defect being inevitable to the conventionel manufacturing methods.

In addition, the finished product can be decorated with the colored designs reproduced on the surface thereof by dyeing the paste resin 3 filled in the intaglioed portion of the metallic pattern 1 so that said surface can stand weathering-proof without coming off the product in protructed use. Moreover, it is also understood that in this method any particular portions of the product can be satisfactorily dyed in selected different colors without fear of becoming discolored and faded in or after the coloring operation.

As has been clarified in the above description, when use is made of a metallic pattern 1 comprising an aggregation of such different metals for example as copper (Cu)

and chromium (Cr), the portion of the paste resin 3 contacting the chromium which is a stabilized metal will remain unchanged in color whereas the rest of the paste resin contacting the copper will easily change its color.

In this connection, it will be necessary to more theoretically study why the above-mentioned change of color occurs to the outer surface of the paste resin, that is, whether it is because a stabilizer employed herein for compound the paste resin reacted with the copper so that a small amount of copper ion was made to migrate into the outer surface to allow Cibalan Scarlet GL or similar dye to react therewith, or it is because the outer surface was weakly acidified by copper oxide and exposed to the influence of the acid radial.

In the following, some preferred embodiments of the present invention will be given by way of example:

EXAMPLE 1

(A) Compounds.—100 parts of polyvinyl chloride synthetic paste resin (121—L made by Nippon Zeon K.K.), 58 parts of the plasticizer (dioctyl phthalate), 2 parts of the stabilizer (dibutyl-tin-malate such as the tin-mercaptide group stabilizer which is nonsulphuric), 6 parts of the coloring agent (titanium oxide ($TiO_2$)).

The gelled paste resin thus formed with the design of the required lace pattern work could be made by use of the above-mentioned compounds.

(B) Compounds.—1 part of metallic complex salt dye (Cibalan Scarlet GL made by Ciba Co., Ltd., Switzerland), 1,000 parts of hot water.

After being immersed in the aqueous solution of the above-mentioned dye, the gelled paste resin of (A) was washed and dried to obtain a product. In this instance, the portion of the paste resin contacting the copper $a$ was changed in red and the rest of the paste resin not contacting the copper $a$, or the portion contacting the chromium remained white so that the white and red colored pattern could be produced.

(C) Compounds.—1 part of metallic complex salt dye (Cibalan Blue BRL made by Ciba Co., Ltd., Switzerland), 1,000 parts of hot water.

After being immersed in the aqueous solution of the above-mentioned dye, the gelled paste resin of (A) was washed and dried to obtain a product. In this instance, the portion of the paste resin contacting the copper $a$ was changed in blue and the rest of the paste resin not contacting the copper $a$, or the portion contacting the chromium remained white so that the white and blue colored pattern could be produced.

(D) Compounds.—1 part of metallic complex salt dye (Cibalan Green GL made by Ciba Co., Ltd., Switzerland), 1,000 parts of hot water.

After being immersed in the aqueous solution of the above-mentioned dye, the gelled paste resin of (A) was washed and dried to obtain a product. In this instance, the portion of the paste resin contacting the copper $a$, or the portion contacting the chromium remained white so that the white and green colored pattern could be produced.

EXAMPLE 2

(A) Compounds.—100 parts of polyvinyl chloride synthetic paste resin (121—L made by Nippon Zeon K.K.), 58 parts of the plasticizer (dioctyl phthalate), 2 parts of the stabilizer (dibutyl-tin-malate such as the tin-mercaptide group stabilizer which is non-sulphuric), 6 parts of the coloring agent (titanium oxide ($TiO_2$)), 1 part of the surface active agent and 0.5 part of water.

The gelled paste resin thus formed with the design of the required lace pattern work could be especially prepared in order that the paste resin could react uniformly with the metallic pattern having its surface comprising an aggregation of different metals similarly to Example 1.

(B) Compounds.—1 part of alizarin dye (Ortol Blue FG made by Badische Anilin & Soda Fabrik, Germany), 1,000 parts of hot water, 1 part of the stain-proof agent (Demol–L made by Kao Atlas K.K.).

After being immersed in the aqueous solution of the above-mentioned dye, the gelled paste resin of (A) was washed and dried to obtain a product. In this instance, the gelled paste resin of (A) was dispersed by contaminating heterogeneous water by use of the surface active agent thereby promoting the chemical reaction between the paste resin and the copper which forms the metalltic pattern, and at the same time provides the groundwork wherein a uniformly dyed product could be obtained.

Further it was also found that when the paste resin fully dispersed by the surface active agent is heated, the water might be at the rate of 0.5 part to 100 parts of the paste resin so as to produce an unblistered product.

In the case that the stain-proof agent in the aqueous solution of dye of (B) is of alkyne naphthalensulfonic acid which is generally used for preventing the cloth from being stained in dyeing operation, it can effectively serve not only to keep the chromium-contacting portion of the resin from being dyed even if it is acidic and not neutral nor alkaline as described above, but also to uniformly dye the surface of the resin thereby preventing this surface from being sporadically stained. Further, any other suitable dyes than the metallic complex salt dye can also be employed due to the use of the stain-proof agent.

EXAMPLE 3

Compounds.—100 parts of polyvinyl chloride synthetic paste resin (101–EP made by Nippon Zeon K.K.), 40 parts of the plasticizer (dioctyl phthalate made by Daiichi Chemical K.K.), 2 parts of the stabilizer (17—M made by Katsuta Chemical K.K.), 6 parts of the coloring agent (titanium oxide).

The material composed of the above-mentioned compounds was made into a sheet shape by calendering process. Said sheet was patterned under heat by means of an embossing roll having the outer peripheral surface thereof formed with the copper and the chromium, and the immersed in the aqueous solution comprising 1 part of the metallic complex salt dye (Cibalan Scarlet GL made by Ciba Co., Ltd., Switzerland) and 1,000 parts of hot water, thereafter being washed and dried. The result was that the portion of the paste resin contacting the copper was changed in red while the rest of the paste resin contacting the chromium was changed in white.

EXAMPLE 4

A sheet was produced through calendering process by use of the material composed of the same compounds as Example 3. Then said sheet was heated and pressed by means of a high frequency welder provided with a pressing metallic pattern having its surface formed with different metals such as copper (Cu) and chromium (Ca). Next it was immersed in the aqueous solution including 1 part of the metallic complex salt dye (Cibalan Blue BRL made by Ciba Co., Ltd., Switzerland) and 1,000 parts of hot water, thereafter being washed and dried so that said heated and pressed portion or the portion of the sheet contacting the copper was changed in blue while the portion contacting the chromium was changed in white.

EXAMPLE 5

A brush shape pattern was formed through an injection molding machine by use of the material composed of the same compounds as Example 3 and a metallic pattern having its surface formed with copper (Cu) and chromium (Cr). Then said pattern was immersed in the aqueous solution including 1 part of the metallic complex salt dye (Cibalan Blue BRL made by Ciba Co., Ltd., Switzerland) and 1,000 parts of hot water, thereafter being washed and dried so that the portion of the pattern contacting the copper was changed in blue while the rest contacting the chorium was changed in white.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed is:

1. In a method of manufacturing synthetic resin works having differently colored parts using a surface of a metallic pattern of copper and chromium, the improvement comprising the steps of
   (A) supplying a resin consisting essentially of polyvinyl chloride to said surface of said metallic pattern so as to coat said surface with said resin;
   (B) heating said resin coated on said surface so as to gel said resin;
   (C) removing the gelled resin from said surface; and
   (D) immersing said removed gelled product in a dyeing solution consisting essentially of a neutral or faint alkaline metallic complex salt whereby only the portions of said product previously in contact with the surfaces of copper are dyed.

2. The method of claim 1, wherein said resin consists essentially of polyvinyl chloride in paste form.

3. The method of claim 1, where said resin consists essentially of polyvinyl chloride in molten mass form.

4. In a method of manufacturing synthetic resin works consisting of a thermoplastic synthetic sheet differently colored in parts on one side thereof and using the surface of metallic embossing pattern of copper and chromium to produce engraved design thereon, the improvement comprising the steps of
   (A) supplying a resin sheet consisting essentially of polyvinyl chloride to the surface of said metallic embossing pattern;
   (B) pressing said pattern against said sheet thereby to emboss said pattern on to the surface of said sheet;
   (C) removing said sheet from contact with said pattern; and
   (D) immersing the embossed sheet in a dyeing solution consisting essentially of a neutral or faint alkaline metallic complex salt whereby only the surface portions of said sheet previously in contact with the copper of said pattern are dyed.

5. In a method of manufacturing synthetic resin works differently colored in parts of a welded film using the surface of a metallic pattern of copper and chromium, the improvement comprising the steps of
   (A) mounting said metallic pattern on a high frequency welder means;
   (B) energizing said welder means so as to heat said pattern;
   (C) supplying a film consisting essentially of polyvinyl chloride synthetic resin on said pattern;
   (D) pressing said film against said pattern thereby embossing said pattern on said film;
   (E) removing said film from said pattern; and
   (F) immersing said embossed film in a dyeing solution consisting essentially of neutral or faint alkaline metallic complex salt whereby only the surface portions of said film previously in contact with said copper surface are dyed.

References Cited
UNITED STATES PATENTS

| | | | |
|---|---|---|---|
| 3,441,635 | 4/1969 | Oshima | 264—166 |
| 2,923,591 | 2/1960 | Rieser | 264—78 XR |
| 3,293,339 | 12/1966 | Gates | 264—78 |

ROBERT F. WHITE, Primary Examiner

R. R. KUCIA, Assistant Examiner

U.S. Cl. X.R.
264—132, 245